United States Patent

Funk et al.

[11] 4,213,487
[45] Jul. 22, 1980

[54] LAMINATE OF METAL WITH THERMOPLASTIC MATERIAL

[75] Inventors: Smith A. Funk, Tampa; Charles J. Klasen, Seminole; Ilmars Vilmanis, St. Petersburg, all of Fla.

[73] Assignee: The Celotex Corporation, Tampa, Fla.

[21] Appl. No.: 872,497

[22] Filed: Jan. 26, 1978

[51] Int. Cl.² .............................................. F16L 9/14
[52] U.S. Cl. ............................... 138/149; 138/143; 138/DIG. 1; 428/463
[58] Field of Search ............... 138/143, 149, DIG. 1; 428/36, 337, 461, 463, 520, 538, 247

[56] References Cited

U.S. PATENT DOCUMENTS

| | | | |
|---|---|---|---|
| 2,891,876 | 6/1959 | Brown et al. | 428/463 X |
| 2,994,632 | 8/1961 | Brown et al. | 428/463 X |
| 3,382,136 | 5/1968 | Bugel et al. | 428/463 X |
| 3,483,664 | 12/1969 | Funk et al. | 156/171 X |
| 3,575,779 | 4/1971 | Chapman et al. | 428/247 X |
| 3,614,967 | 10/1971 | Royston | 138/149 X |
| 3,753,938 | 8/1973 | Edwards et al. | 428/463 X |
| 3,764,430 | 10/1973 | Schrenk | 428/463 X |
| 3,847,724 | 11/1974 | Powers et al. | 428/463 X |
| 3,980,107 | 9/1976 | Barnes | 138/143 |
| 3,995,540 | 3/1974 | Mildoner | 428/463 X |
| 4,037,020 | 7/1977 | Ishio et al. | 428/463 |

*Primary Examiner*—Richard E. Aegerter
*Assistant Examiner*—James E. Bryant, III
*Attorney, Agent, or Firm*—James W. Grace; Charles W. Vanecek

[57] ABSTRACT

A process for producing a laminate comprising a metal sheet having thermoplastic material on both sides thereof is described. The thermoplastic material is calendered to produce an upper thermoplastic sheet and a lower thermoplastic sheet. A metal sheet is fed into the nip between the calender rolls in order to contact the metal sheet simultaneously with the upper and lower thermoplastic sheets, thus producing a laminate. Processes for producing a pipe-wrapping material, a roofing structure and a solvent-welded joint are also provided.

1 Claim, 4 Drawing Figures

LAMINATE OF METAL WITH THERMOPLASTIC MATERIAL

BACKGROUND OF THE INVENTION

Calendering processes are well-known and are disclosed, for example, in U.S. Pat. Nos. 3,159,516; 3,457,139; 3,505,143; 3,589,975; 3,623,933; 3,767,510; 3,930,922; and 3,976,528.

U.S. Pat. Nos. 3,483,664, 3,575,779 and 3,753,938 all disclose laminates of chlorinated polyethylene. In these prior art patents a laminate of three layers had to be formed by two passes through a calender or by heat-pressing.

Previously used pipe-wrapping materials have not provided adequate impermeability and weatherability. A metal pipe-wrapping material is not adequately resistant to the weather and can have the disadvantage of being a conductor of electricity. Thermoplastic material alone is not sufficiently resistant to vapor permeation. Additionally, the sealing of pipe-wrapping materials, particularly for cryogenic applications, often does not produce good vapor-tight and water-tight seals.

OBJECTS OF THE INVENTION

It is an object of the invention to provide a process for producing a laminate of a metal sheet having thermoplastic material on both sides thereof formed in a single pass through a calender. It is another object of the invention to provide a process for producing a suitable material for use as a pipe-wrap. It is a further object of the invention to provide a process for producing a material suitable for use as a roof flashing. It is yet another object to provide a solvent-sealed joint.

The metal sheet provides impermeability and the thermoplastic material provides weatherability and ease of handling, the laminate being flexible but strong. A particular advantage of this type of product is that the laminate does not conduct electricity which makes it a safe material in applications where there is a possibility of inadvertent electrical contact. The laminate is particularly tough and resists puncturing as opposed to metal sheet alone. The bonding of adjacent layers of the thermoplastic material by solvent seal is simple and provides good vapor-tight and water-tight seals. This is particularly important in cryogenic applications although this type of pipe wrap would also be useful at other temperatures. Generally, the upper temperature for the use of the laminate is limited to that temperature at the inner surface of the pipe-wrap which would cause degradation or deterioration of the pipe-wrap. Thus, the pipe-wrap can be used where high temperature fluids are conveyed through an insulated pipe provided the temperature at the interface between the outer surface of the pipe insulation material and the inner surface of the pipe-wrap is below the degradation temperature of the thermoplastic laminate of the pipe-wrap. Other uses are in corrosion-resistant areas such as metal flashing and other building uses.

SUMMARY OF THE INVENTION

According to the present invention, there is provided a process for producing a laminate comprising a metal sheet having thermoplastic material on both sides thereof, said process comprising the steps of:

I. Calendering thermoplastic material through the nip of a first roll and a second roll to produce an upper thermoplastic sheet;

II. Calendering thermoplastic material through the nip of a third roll and a fourth roll to produce a lower thermoplastic sheet;

III. Feeding a metal sheet into the nip between the second roll and the third roll while contacting the upper thermoplastic sheet with the top of the metal sheet and while contacting the lower thermoplastic sheet with the bottom of the metal sheet whereby the two plastic sheets simultaneously adhere to the metal sheet thus producing a laminate.

A laminate of the present invention is produced in only one pass of the material through the calender.

DETAILED DESCRIPTION OF THE INVENTION

Figure 1:
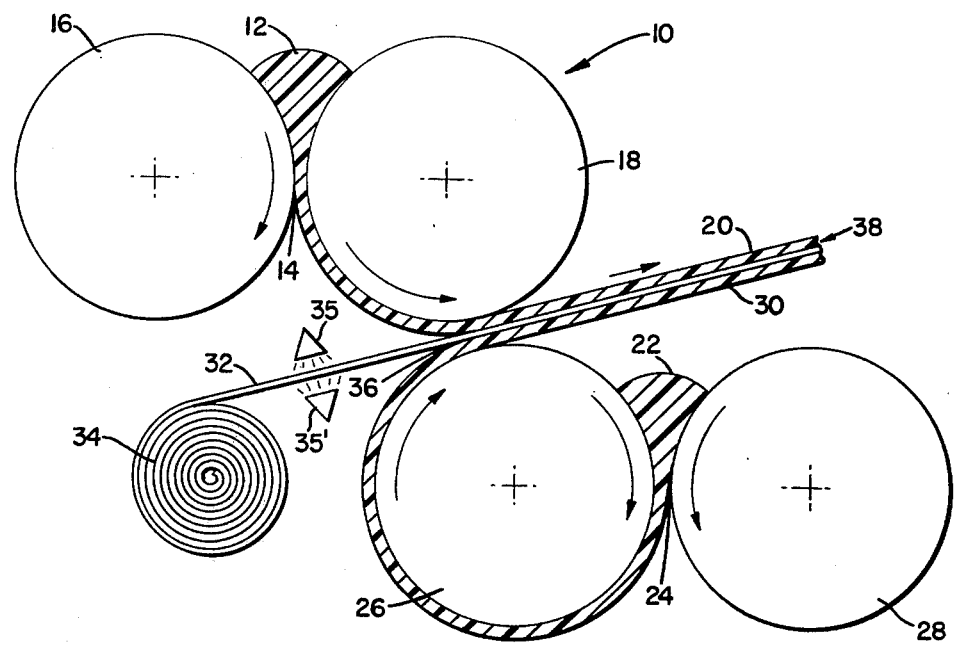
FIG. 1 shows an apparatus suitable for practicing the process of the present invention.

Included among the synthetic thermoplastic resins which can be employed to produce the thermoplastic sheets are those which are disclosed in U.S. Pat. Nos. 3,483,664 and 3,575,779 (hereinafter referred to as "Chapman"), such as chlorinated polyethylene, chlorosulfonated polyethylene, polyvinyl chloride, polychloroprene, polyisobutylene, and polyvinyl fluoride. The preferred thermoplastic materials are an elastomeric chlorinated linear polyethylene and polyvinyl chloride.

Such thermoplastic materials, such as those described in Chapman, may be combined with fillers, pigments and stabilizers, depending upon the final desired properties of the laminate. Amounts of total filler and pigments may range up to as much as 300 parts per hundred parts of resin. Preferably, the total amount of filler and pigment ranges between about 20 to 200 parts per hundred parts of resin. Examples of suitable fillers which can be used include silica or silica hydrates; silicates, for example, calcium or alkaline earth silicates; materials containing silicates; silicon carbide; sulphates or alkaline earth metals; and other fillers such as calcium carbonate. Organic and mineral pigments can be incoporated into the thermoplastic material, for example, titanium dioxide, carbon black, iron oxide, or other pigments, used either alone or in blends. Amounts of pigments can vary from about 2 parts to about 50 parts per hundred parts by weight of the resin mixture. Before calendering, the thermoplastic material is maintained at a temperature above its glass transition temperature but below its melting point.

The metal sheet may be of any metal that can be formed into a thin sheet from a thickness of about 0.001 inch up to the maximum thickness that can be wound on a roll suitable for calendering processes. Of course, with regard to cost, availability and ease of handling stainless steel foil and aluminum are preferred. The aluminum or stainless steel sheet used in the laminating process generally has a thickness of 0.001 to 0.1 inch. The surfaces of the metal sheet are coated with an adhesion promoter. The preferred adhesion promoting coating is a copolymer of 86 percent by weight of vinyl chloride with 14 percent vinyl acetate. A suitable adhesion promotion coating is the primer named RC-71-50 available from the Reynolds Metal Company, Richmond, Va.

In the calendering process using chlorinated polyethylene and aluminum, to produce a laminate comprising an aluminum sheet having chlorinated polyethylene on both sides thereof, chlorinated polyethylene composition at 250° to 350° F. is passed through the nip of a first roll and a second roll separated by 0.003 to 0.200 inch to produce an upper chlorinated polyethylene sheet adhering to the second roll. Similarly, chlorinated polyethylene composition at 250° to 350° F. is passed through the nip of a third roll and a fourth roll separated by 0.003 to 0.200 inch to produce a lower chlorinated polyethylene sheet adhering to the third roll. The aluminum sheet is fed into the nip between the second roll and the third roll while contacting at 250° F. to 350° F. the upper chlorinated polyethylene sheet with the top of the aluminum sheet and while simultaneously contacting the lower chlorinated polyethylene sheet with the bottom of the aluminum sheet. The temperature of the chlorinated polyethylene sheet may be from 300° to 400° F. when the thermoplastic material contains polyvinyl chloride. The top and the bottom of the aluminum sheet have thereon a coating of a copolymer of 10 to 20 percent by weight of vinyl acetate, the balance of the copolymer being essentially vinyl chloride. The separation of the second and third roll is substantially equal to the sum of the thicknesses of the upper chlorinated polyethylene sheet, the aluminum sheet and the lower chlorinated polyethylene sheet.

The process is the same for other materials; for example, polyvinyl chloride and stainless steel foil. The thermoplastic material may be cooled prior to contacting the metal sheet but there must be sufficient heat and pressure present to provide for the adhesion of the laminate.

If necessary, the metal sheet may be heated from an exterior source prior to entry into the nips. The laminate has a thickness typically of 0.006 to 0.5 inch.

The invention will be further described by reference to the drawings wherein FIG. 1 shows an apparatus 10 for practicing the process of the present invention. Thermoplastic material 12 is deposited at the nip 14 of first calender roll 16 and second calender roll 18 and passes through the nip 14 to produce an upper thermoplastic sheet 20. Thermoplastic material 22 is also deposited at the nip 24 of third calender roll 26 and fourth calender roll 28. The thermoplastic material 22 passes through the nip 24 to form lower thermoplastic sheet 30. Coated metal sheet 32 is fed from roll 34 between exterior heat sources 35 into the nip 36 of second calender roll 18 and third calender roll 26 so that the upper thermoplastic sheet 20 contacts the top of the metal sheet 32 and the lower thermoplastic sheet 30 simultaneously contacts the bottom of the metal sheet 32 thus forming the laminate 38 in one pass through the calender.

Figure 2:
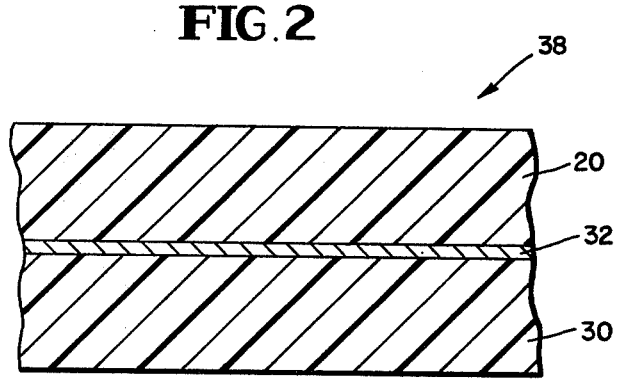
FIG. 2 is a cross-sectional view taken along Line 2—2 of FIG. 1 and shows a laminate.

FIG. 2 shows the laminate 38 formed in the process of the present invention wherein the upper thermoplastic sheet 20 and the lower thermoplastic sheet 30 each contact the upper and lower surfaces, respectively, of metal sheet 32.

Figure 3:
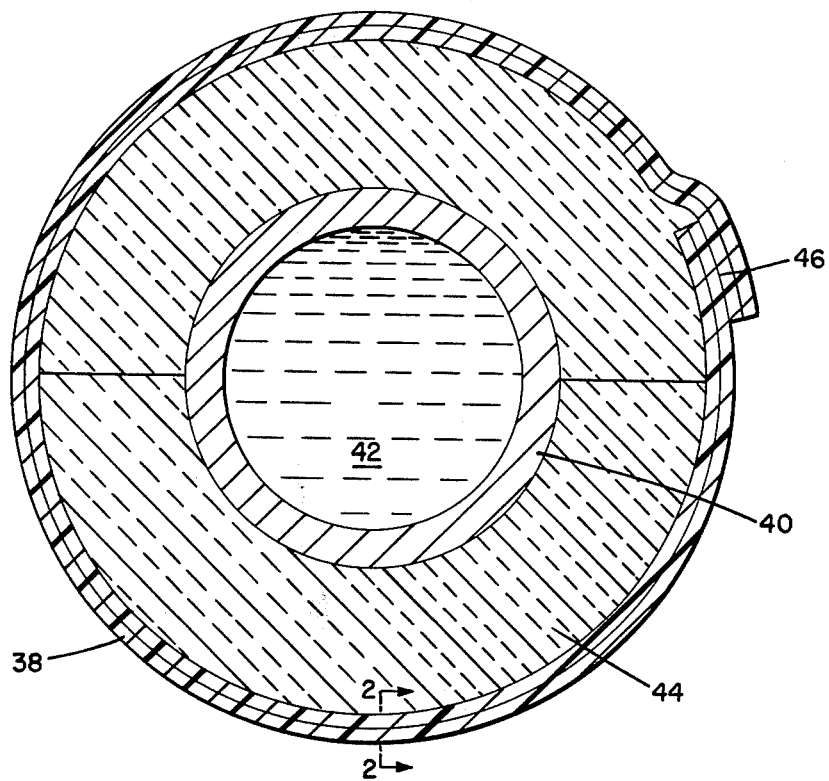
FIG. 3 shows a pipe wrapping using the product of the process of the present invention.

FIG. 3 shows the use of the laminate 38 as a pipe wrapping material. Pipe 40 is used for transporting contents 42 which are desired to be kept at a temperature other than ambient temperature, necessitating an insulated pipe wrap. Insulating material 44 surrounds pipe 40 to a thickness necessary to provide the required degree of thermal insulation. The thermal insulation 44 is wrapped with a sheet of laminate 38 in order to secure the insulation 44 around pipe 40. The edges of laminate 38 overlap each other and are secured with a solvent seal 46. The solvent seal 46 runs longitudinally parallel to the length of pipe 40. The overlapping thermoplastic surfaces of laminate 38 are sealed by the application of a suitable solvent.

Figure 4:
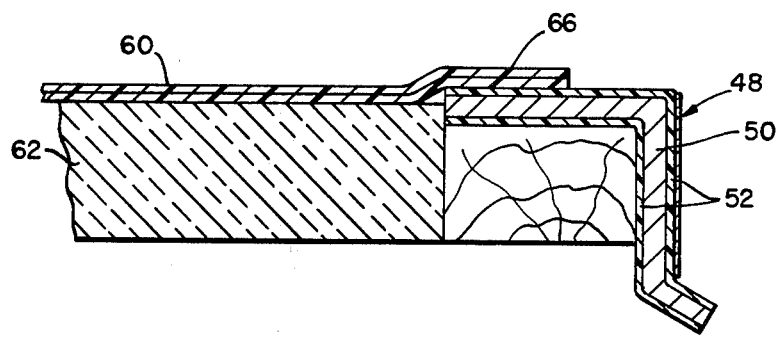
FIG. 4 shows a flashing using the product of the process of the present invention, sealed with a joint of the present invention.

FIG. 4 shows the use of plastic-clad metal roof flashing 48 comprising a laminate of a metal layer 50 and two thermoplastic layers 52. A plastic roof sheet 60 covers the roof insulation 62. A water-tight joint 66 is solvent-sealed between the roof sheet 60 and the plastic-clad metal roof flashing 48.

A specially formulated plastic tape may also be used to seal, via a solvent welding method, the overlapped portions of the seam.

Suitable solvents are chosen to weld the thermoplastic surfaces together to form a water-tight seal. For example, toluene can be used to weld surfaces of chlorinated polyethylene together, and tetrahydrofuran can be used for polyvinylchloride. Other suitable solvents will be apparent to one skilled in the art.

The exact process as described herein has been practiced in the pior art with the single exception that the roll 34 of metal was previously a roll of scrim. It is possible to make an aluminum and chlorinated polyethylene laminate by an entirely different process as is shown in U.S. Pat. No. 3,575,779.

The pipe can be any pipe previously employed for the transporting of low temperature fluids. In general, any pipe that will withstand the temperatures and pressures employed is suitable. The pipe can be of any material such as steel, cast iron, copper or plastics such as polyvinyl chloride.

The low temperature fluid can be any fluid having a temperature below the dew point of the surrounding air. When the low temperature fluid has a temperature below the dew point of the surrounding air, the moisture in the air tends to condense on the outermost portion of the conduit and can freeze if the temperature is low enough. The fluid can be a gas, vapor or liquid. Examples of suitable liquids include among others refrigerants such as brine or chlorinated hydrocarbons such as the freons or cryogenic liquids such as liquid nitrogen, liquid hydrogen, liquid oxygen and liquid helium.

In addition, high temperature fluids can be used in the system provided the temperature at the inner surface of the thermoplastic pipe-wrap does not exceed the degradation temperature of the thermoplastic material.

Chlorinated polyethylenes are described in the Chapman patent. Preferred species are described below.

The chlorinated polyethylene has a glass transition temperature of less than 20° C. as measured by ASTM test D-1-48-G1T.

The chlorinated polyethylene has a crystallinity of less than 3% measured as described in Chapman, Column 4, Lines 7–10.

The chlorinated polyethylene has a melt viscosity of 8,000 to 25,000 poises. The melt viscosity is determined in an Instron capillary rheometer with a 0.05"×2" capillary at 190° C. and 150 Sec-1 shear rate. This is a test used by Dow Chemical Company of Midland, Mich., U.S.A.

The chlorinated polyethylene comprises from 25 to 50 percent by weight chlorine based on the weight of the chlorinated polyethylene.

The calcium carbonate functions as a filler in the thermoplastic material. The calcium carbonate is finely divided and generally passes through a screen of 100 mesh/inch and preferably passes through a screen of 300 mesh/inch. The calcium carbonate can be in either of its crystalline forms, i.e., marble or chalk. It can be uncoated or coated but is preferably coated with a fatty material such as stearate. A suitable calcium carbonate is that sold under the tradename "OMYA-BSH" from the Pleuss-Staufer Chemical Company (North America, Inc.) and that sold under the tradename GAMAS-PERSE for The Georgia Marble Company. The calcium carbonate and the chlorinated polyethylene can be present in widely varying amounts but are generally present in a weight ratio of 1:5 to 5:1.

The thermoplastic material also contains stabilizers in an amount sufficient to inhibit undesirable degradation reactions. Examples of suitable stabilizers include among others "ERLA-4221," the chemical composition of which is 3,4-epoxy-6-methylcyclohexylmethyl-3,4-epoxy-6-methylcyclohexane-carboxylate and is available from Union Carbide Company; "Ionol" available from the Shell Chemical Corporation, the chemical composition of which is 2,6-di-tert-butyl-4-methylphenol; sorbitol and pentaerythritol and mixtures thereof. The stabilizer can be present in a minor proportion, i.e., in amounts ranging from about 0.1 to about 5% of the total weight of the formulation.

The thermoplastic material also contains a pigment in an amount sufficient to impart the desired degree of opacity to the thermoplastic material. The pigment generally comprises from 1 to 35 percent by weight of the thermoplastic material. Examples of suitable pigments include among other titanium dioxide, carbon black, and antimony trioxide.

The thermoplastic material can optionally contain additional ingredients such as plasticizers, oils, ultraviolet light absorbers, anti-blocking agents and other ingredients commonly found in similar thermoplastic materials.

The invention may be better understood by reference to the following examples wherein all parts and percentages are by weight unless otherwise indicated. These examples are designed to teach those skilled in the art how to practice the present invention and represent the best mode contemplated for practicing the present invention.

EXAMPLE 1

A thermoplastic material useful in the present invention is formulated by mixing the following ingredients:

| Item | Ingredient | Parts |
|------|------------|-------|
| A | Chlorinated Polyethylene | 100 |
| B | Calcium Carbonate | 78 |
| C | Titanium Dioxide | 25 |
| D | Stabilizers | 5 |
| E | Plasticizer | 5 |
| F | Processing aid | 0.5 |

The chlorinated polyethylene cited as Item A comprises 2 grades of chlorinated polyethylene; namely, CPE 3614 and XO 2243.46 used in a 60 to 40 ratio by weight and obtained from Dow Chemical Company, Midland, Mich.

The calcium carbonate is OMYA-BSH from Pleuss-Staufer, North American Incorporated.

The calcium carbonate passes through a 300 mesh/inch screen and has a stearate coating thereon.

The titanium dioxide is Ti-Pure R-960 from E. I. DuPont Company, Wilmington, Del.

The stabilizers are ERLA, from Union Carbide, Ionol from Shell Chemical and pentaerythritol from the Chemicals Division of Charles Pfizer Company. in a 3:1:1 ratio by weight.

The plasticizer is Morflex 510 having a chemical composition of tri(2-ethylhexyl) tri mellitate, obtainable from Chemical Division of Charles Pfizer Company.

The processing aid is calcium stearate 8 from American Cyanamid.

EXAMPLE 2

A thermoplastic material useful in the present invention is formulated by mixing the following ingredients:

| Item | Ingredient | Parts |
|------|------------|-------|
| A | Polyvinyl Chloride | 100 |
| B | Calcium Carbonate | 10 |
| C | Titanium Dioxide | 20 |
| D | Stabilizers | 7 |
| E | Plasticizer | 60 |
| F | Processing Aid | 0.5 |

The polyvinyl chloride is Diamond 450 from Diamond Shamrock Company.

The calcium carbonate is OMYA-BSH from Pleuss-Staufer, North American Inc. The calcium carbonate passes through a 300 mesh/inch screen and has a stearate coating thereon.

The titanium dioxide is Ti-Pure R960 from E. I. DuPont Inc.

The stabilizers are PLAS-CHEK 775 and Ferro 822, both from Ferro Chemical Company.

PLAS-CHEK is epoxidized soya bean oil.

Ferro 822 has a chemical composition of di butyl tin mercaptide.

The plasticizer is Paraplex-G-54 (a polyester type plasticizer) from Rohm & Haas Company.

The processing aid is stearic acid.

EXAMPLE 3

The thermoplastic material of Example 1 is contacted with an aluminum sheet 0.005 inch thick as described herein with reference to FIG. 1. The aluminum sheet has been previously coated with a copolymer of vinyl chloride and vinyl acetate. The resultant laminate 38 is satisfactory.

EXAMPLE 4

The thermoplastic material of Example 2 is contacted with a stainless steel sheet 0.005 inch thick as described herein with reference to FIG. 1. The stainless steel sheet has been suitably prepared and previously coated with a copolymer of vinyl chloride and vinyl acetate. The resultant laminate is satisfactory.

EXAMPLE 5

A pipe having a one-inch outside diameter is covered with 3" of insulation 44 as shown in FIG. 3. The insulation 44 is then covered with the laminate 38 produced in Example 2. A seal 46 is formed by brushing on toluene and then pressing the two toluene-coated sides together to form the seal 46. Because the plastic material has been dissolved, the seal 46 is actually a unitary structure no longer exhibiting separate surfaces. Liquid nitrogen is caused to flow through the pipe. There is no evidence of water vapor in the form of ice or otherwise in the insulation.

Although the invention has been described in considerable detail with reference to certain preferred embodiments thereof, it will be understood that variations and modifications can be effected within the spirit and scope of the invention as described above and as defined in the appended claims.

What is claimed is:

1. A conduit for transporting fluids through atmospheric air comprising:
   A. a pipe;
   B. thermal insulation surrounding the pipe;
   C. a moisture vapor barrier completely surrounding the thermal insulation said moisture vapor barrier constituting a laminate comprising:
   I. an aluminum sheet:
      (a) having a thickness of 0.001 to 0.1 inch;
      (b) having on its surfaces an adhesion-promoting amount of a copolymer of vinyl chloride and vinyl acetate; and
   II. an upper sheet of thermoplastic material adhering to the top of the aluminum sheet; and
   III. a lower sheet of thermoplastic material adhering to the bottom of the aluminum sheet;
   wherein the thermoplastic material consists essentially of:
      (a) chlorinated polyethylene:
         (1) having a melt viscosity of 8,000 to 25,000 poises;
         (2) comprising from 25 to 50 percent by weight chlorine;
         (3) having a crystallinity of less than 3%;
         (4) having a glass transistion temperature of less than 20° C.; and
      (b) calcium carbonate having a particle size such that it passes through a U.S. standard screen of 100 mesh/inch;
   wherein the weight ratio of a:b is 1:5 to 5:1;
      (c) a pigment comprising from 1 to 35 percent by weight of the thermoplastic material; and
      (d) a stabilizer.

* * * * *